United States Patent [19]

Beshoner, Sr.

[11] 4,168,590
[45] Sep. 25, 1979

[54] LIVE BAIT SUPPORT APPARATUS

[76] Inventor: Edward C. Beshoner, Sr., 106 Woodlawn La., Mandeville, La. 70448

[21] Appl. No.: 840,616

[22] Filed: Oct. 11, 1977

[51] Int. Cl.² .............................................. A01K 97/04
[52] U.S. Cl. ...................................................... 43/55
[58] Field of Search ...................... 43/55, 57; 119/3, 5

[56] References Cited

U.S. PATENT DOCUMENTS

| 2,639,906 | 5/1953 | Butler | 43/57 X |
|---|---|---|---|
| 3,815,547 | 6/1974 | Willinger et al. | 119/5 |

Primary Examiner—James L. Jones
Assistant Examiner—James G. Smith
Attorney, Agent, or Firm—C. Emmett Pugh & Associates

[57] ABSTRACT

An aeration device which can be adapted without permanent connection to an existing container such as an ice chest is disclosed. The apparatus provides a baffle which substantially conforms to the cross section of the container thus dividing it into first and second sections. One side of the baffle is provided with a pump which transmits fluid from the second section in the container through the baffle to the first section where it enters an aeration sparge thereby creating a plurality of high speed water jets which strike the water surface of the first section and aerate the same. The second section of the container houses a pump which is separated from the fish, thereby preventing the intake of fish and into the pump and halting its proper function. A flow opening can be provided in the baffle to enhance the flow of fluid from one side of the baffle to the other. In the preferred embodiment, no permanent connections are made between the aeration apparatus and the ice chest or like container to which it is associated with during use. The device can be equipped with a handle so that it can be lifted completely out of the ice chest or like container when it is desired in use for another capacity. A brace is provided to the device by means of the elongated sparge which extends a distance from the baffle to the opposite end of the ice chest and contacts it so as to act as a brace for the apparatus. The brace further comprises a pump base on the side of the baffle opposite the sparge.

7 Claims, 5 Drawing Figures

LIVE BAIT SUPPORT APPARATUS

BACKGROUND OF THE INVENTION

1. Field of the Invention

The present invention relates to devices for aerating fluid so as to create a suitable habitat for the housing of fish, shrimp, and the like marine life. The present invention more particularly relates to aerating apparatus which can be added without permanent connections to a desirable container such as an ice chest or the like, which, when filled at least partially with water provides a suitable habitat for fish, shrimp, and like delicate marine life.

2. General Background and Prior Art

Fishermen have for years been plagued with the problem of keeping live bait such as minnows, shrimp, smaller fish and like delicate marine life alive during the course of a day's fishing. Live bait, and more specifically baitfish, require in general, three things for their survival in a container once removed from their environment. These are the liquid of their natural habitat, be it fresh or salt water, oxygen and temperature control. Any fisherman will tell you the fate of minnows placed in a bucket of water in the hot sun. The minnows will gasp for oxygen as it escapes from the water as its temperature rises, and as the minnows themselves consume it. Many devices have been provided which have attempted to keep fish, shrimp and like live bait alive for periods of time.

Early fisherman were provided with very crude bait wells in the bottom of wooden skifts. Later, aluminum skifts came into the market place, which were equiped with crude live bait wells. Generally, in these early forms of bait wells, no aeration or other mechanical means for adding oxygen to water was provided and the time which bait could be kept alive was limited.

Later, fisherman began using plastic cans such as a garbage can type vessel that had an air pump which pumped air or oxygen directly into the water so as to aerate it. Larger vessels to carry more water while keeping bait alive for longer periods of time, added a tremendous amount of weight to the weight of the boat and likewise made the boat crowded. The use of the air pumps, while helping somewhat, was awkward and clumsy with the air pumps being difficult to maintain. When newer types of aeration devices came onto the market or came into use, there were still two problems which had to be solved. The first problem was that there was often insufficient spray from a sprayhead or like aerator to give the bait adequate oxygen or to dissolve adequate oxygen into the water. Secondly, the pump which was used in the bait well often became clogged with the bait itself, or with trash which accumulated within the vessel. Additionally, many prior art devices are very bulky or expensive, making them unattractive to the sportsman who fishes only on occasional weekends.

Some prior art devices have been patented which have attempted to solve the problems of the prior art. The following table provides a listing of some prior art devices which have been granted patents.

| Prior Art Patents | | |
| --- | --- | --- |
| Patent No. | Inventor(s) | Issue Date |
| 3,835,575 | Arnetta B. Kelley | September 17, 1974 |
| 2,936,542 | J.H. Butler, et al | May 17, 1960 |
| 2,639,906 | T.P. Butler | May 26, 1953 |
| 3,882,498 | Don T. Butler | July 9, 1974 |

3. General Discussion of the Present Invention

The present invention solves the prior art problems and short comings by providing an aeration apparatus which can be added to an existing conventional container such as an ice chest without permanent or damaging attachment thereto. The device provides a water mover or pump separated from the fish by a baffle which divides the container into two sections. The device thus can be removed and stored after use and the container (such as an ice chest) returned to its normally intended use.

The present invention provides an apparatus for aerating a liquid in a container such as a conventional ice chest. Such an ice chest or like container is particularly well adapted to the present invention because of its insulative properties which maintain a desired water temperature. This in conjunction with the apparatus of the present invention which provides suitable aeration to the already temperature controlled water provides an especially suitable habitat for delicate marine life such as fish, shrimp and the like which are used by fishermen for bait.

The present invention provides a baffle which conforms substantially to the cross section of a container such as a conventional ice chest. The baffle has a flow opening therethrough, the opening being provided preferably with a screen which prevents the travel of fish from one side of the baffle to the other. The baffle forms a divider—a first section is created having the desirable fish, shrimp, or like marine life to be used for bait, and the other side of the baffle provides a second section which houses a suitable means for moving the water such as a pump. The pump can preferably be elevated a distance above the bottom of the container so as to prevent the intake of trash which normally settles to the bottom when fluid flows from the aerated and agitated section of the container to the non-aerated section housing the pump.

A sparge or like suitable mechanical means (preferably mounted above the water surface) is provided to transform the fluid pumped by the pump into at least one high speed water jet which strikes the surface of the water in the first section which houses the marine life. This effects a mechanical aeration of the water or other suitable liquid to raise the oxygen content to desireable levels.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

Figure 1:
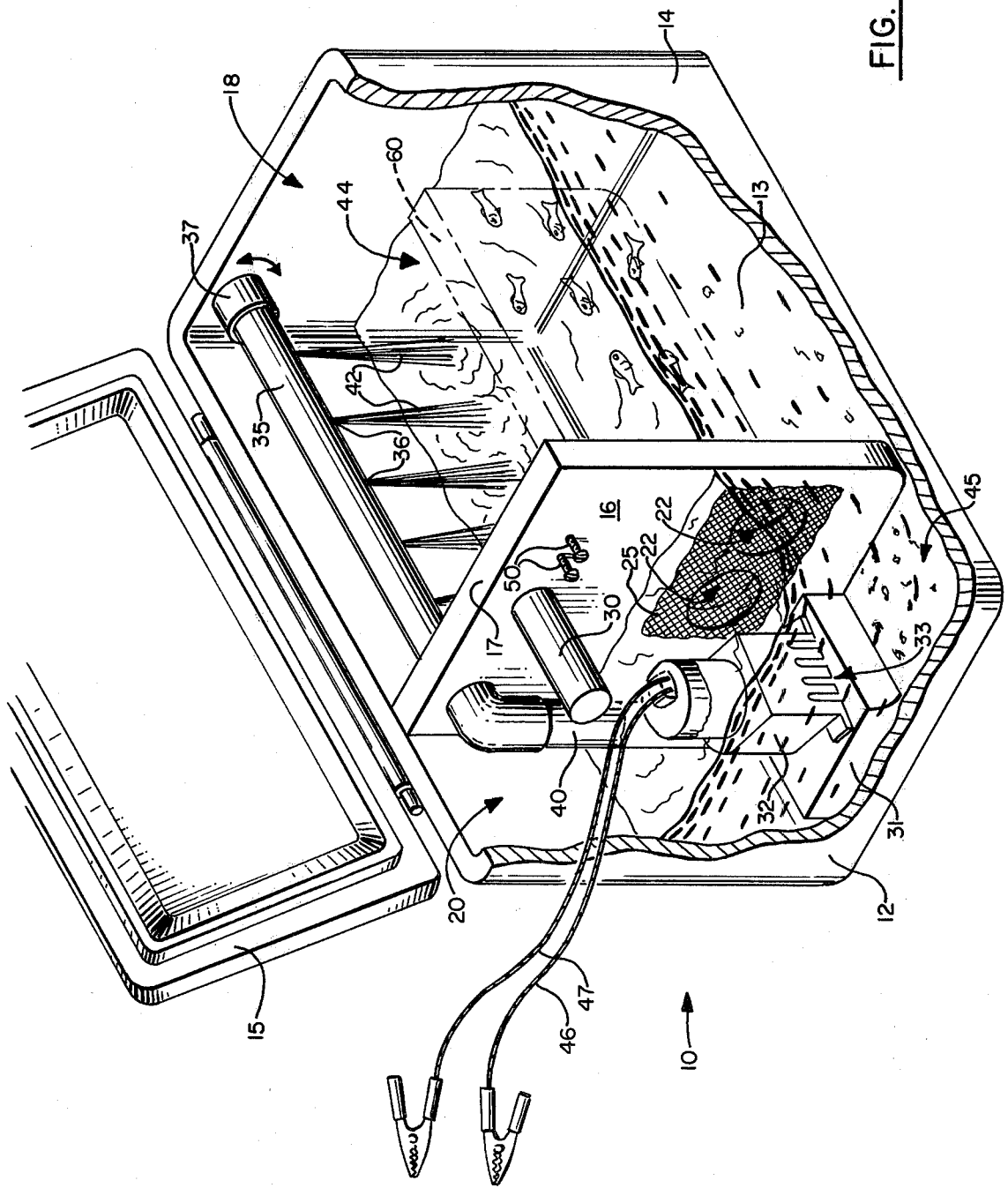
FIG. 1 is a perspective view of the preferred embodiment of the apparatus of the present invention shown in operation in a conventional ice chest.

FIG. 1 best shows the apparatus of the present invention designated generally by the numeral 10 in FIG. 1. In FIG. 1 there can be seen a container 12 such as a conventional ice chest which has a lower container portion 14 and an upper lid 15. An ice chest is exemplary of a container 12 which could be used in conjunction with the apparatus 10 of the present invention (as will be discussed more fully hereinafter). Aerator 10 can be manufactured to conform to substantially any conventional container, the spirit of the present invention being to provide an apparatus 10 which can be added without permanent attachment to virtually any container and removed therefrom when the container is to return to its originally intended use. An ice chest as container 12 is illustrated with the preferred embodiment since ice chest 12 has insulative properties which would maintain a certain water temperature as would be desireable to sustain life of delicate marine animals such as minnows, shrimp, and the like, which are used by fishermen as bait. Because of its insulative properties, a fisherman could periodically add a few ice cubes to the fluid 13 within container 12 for temperature control in hot weather. Similar temperatures could be achieved in cold weather if desired by adding warm water.

In FIG. 1, there can further be seen in ice chest 12 baffle 16 which separates container 12 into a first section 18 (housing fish 27) and a second section 20 (housing pump 32).

Figure 4:
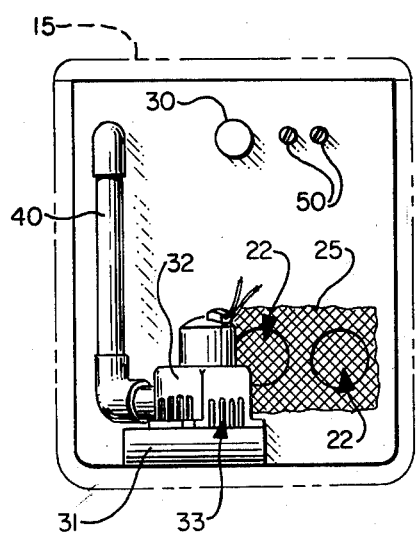
FIG. 4 is a left side view of the preferred embodiment of the apparatus of the present invention shown in a conventional ice chest (in phantom lines)
Figure 5:
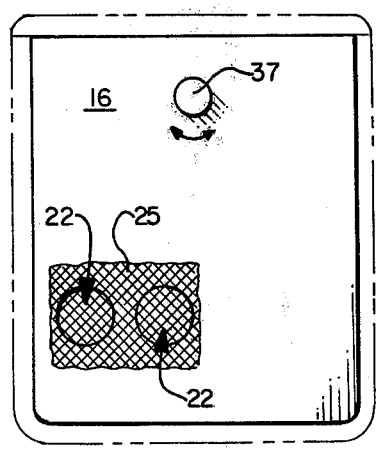
FIG. 5 is a right side view of the preferred embodiment of the apparatus of the present invention shown in a conventional ice chest (in phantom lines).

It should be understood that baffle 16 is dimensional and sized so as to substantially conform to the cross sectional area and dimensions of container 12. This would include an overall height which would cause the top portion 17 of baffle 16 to abut and fit comfortably against lid 15 when lid 15 was closed. (See FIGS. 4 and 5). Thus, the only flow of fluid (other than minor leaks) would be through openings 22 provided in baffle 16 as can be seen in FIG. 1. Openings 22 and baffle 16 provide flow openings through which fluid can flow from section 18 to section 20. (See arrows, FIG. 3). A screen 25 can be provided to prevent the travel of undesireable matter such as the fish 27 from first section 18 to second section 20. It is important that baffle 16 substantially conform to the cross section of container 12 to prevent the inadvertent travel of fish 27 from first section 18 to second section 20. Such inadvertent travel could be possible during heavy seas when a great deal of splashing may occur within the container 12. A one eighth (⅛") inch mesh size for screen 25 is exemplary.

A handle 30 can be provided which is attached to one side of baffle 16 as is shown best in FIG. 1. In the preferred embodiment, handle 30 can be of a length so as to extend from baffle 16 to the end wall portion of container 12 as is shown in FIG. 1. This would be an aid to brace the apparatus 10 within the container 12, and prevent it from excessively rattling or moving when once placed in operation.

Two other "braces" are provided for maintaining the apparatus 10 in its proper position within container 12. These are base 30 upon which a suitable water mover such as pump 32 can rest. Brace 30 as can best be seen in FIG. 3 can be made to exactly conform to the bottom corner most end portion of container 12 and thus act as a brace against that corner. As can best be seen in FIG. 3, base 31 would extend the same distance substantially from baffle 16 as would handle 30. Another brace is provided in the form of sparge 35.

Sparge 35 as shown in FIG. 1 is an elongated pipe having a plurality of openings 36 therein. The end portion of sparge 35 farthest from baffle 16 is provided with a bumper 37 which abuts the end portion of container 12 opposite pump 32. Thus, it can be seen that an overall bracing arrangement has been provided with the apparatus of the present invention to suitably retain it within container 12. Fore and aft movement of the device is prevented since baffle 16 substantially conforms to the cross sectional area of the container 12. Likewise, when lid 15 is closed, up and down movement of the device is prevented due to the conforming size of baffle 16. Further, side to side movement of the device is prevented by means of the elongated brace-like structure of sparge 35 which abuts one end portion of container 12, with the other end portion of container 12 being abutted and braced by handle 30 and base 31 (note FIGS. 2 and 3).

It can be seen from the above by one skilled in the art, that the device will have little or only very minimal (but no undesirable) movement. Once container 12 is closed and even though it may be used on a boat, for example by fishermen during the rocking of the boat on heavy seas, motion is minimal.

A suitable pump 32 or like water mover is provided in the second section 20 of container 12. Notice from an inspection of FIG. 1 that pump 32 is placed on the opposite side of baffle 16 from first section 18 which houses fish, shrimp, or like marine life to be used as bait. This is important because this prevents fish 27 from being taken into pump 32 causing the destruction or malfunction of either. Note that a screen 25 is provided over openings 22 to prevent the entry of large objects of trash, and fish 27. Pump 32 conveys water or other desirable liquid through conduit 40 into sparger 35.

Sparger 35 is provided with at least one reduced orifice 36 through which water will flow so that high speed jets of water 42 will be directed downwardly and hit against the surface 44 of the liquid. This will produce a highly desirable mechanical aerating action which will maintain a high oxygen content in the liquid and thus sustain the marine life as is desirable.

Figure 2:
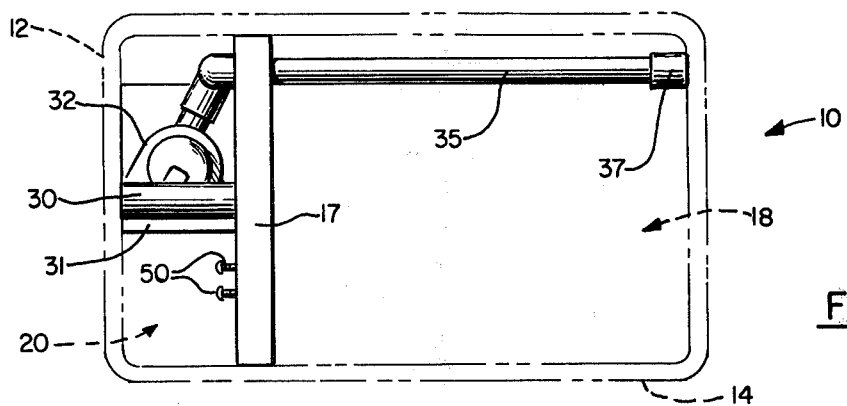
FIG. 2 is a top view of the preferred embodiment of the apparatus of the present invention shown in a conventional ice chest (in phantom lines)
Figure 3:
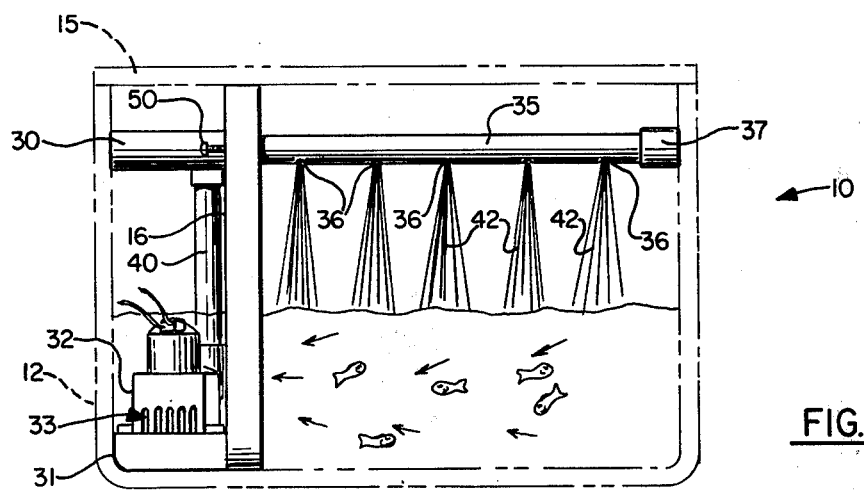
FIG. 3 is a front sectional view illustrating the preferred embodiment of the apparatus of the present invention shown in a conventional ice chest (in phantom lines)

In the embodiment shown in FIGS. 1-3, a plurality of orifices 36 are provided and a corresponding plurality of high speed jets 42 of liquid is seen striking the surface 44 of the liquid within container 12. The opening diameter as well as the spray pattern and number of sprays could be varied to fit the needs of individual species of fish, shrimp, or the like. The sparge 35 can be rotatably mounted (note arrow, FIGS. 1 and 5) so that high speed jets 42 can be pointed downward or sideward to give differing aerating results. In some instances (with more delicate fish for example) it may be desireable to direct jets 42 to the sidewalls of container 12 for less agitation.

Sparge 35 can be removable from baffle 16. Such a removable feature will aid in the cleaning of the orifices 36 should they become clogged.

A further desirable feature is achieved by the use of baffle 16 to divide container 12 into first and second sections 18, 20. Note that the aeration and turbulant activity produced by high speed water jets 42 occur in the first section 18 of container 12 which houses fish 27. Thus, any turbulant activity would churn up undesirable sediment in the first section 18 and generally not in the second section 20 which houses pump 32. Undesirable settlement will settle to the bottom of second section 20 and therefore not be taken into pump 32 where it can do damage. To further deter the intake of undesireable sediment into pump 32, the base 31 is provided to raise the intake 33 of pump 32 a distance above the bottom 45 of container 12.

Pump 32 can be powered by any suitable means such as electricity, and for use in remote areas, a 12 volt examplary electrical current can be supplied to pump 32 through power cables 46, 47, as is known in the art. Thus, the individual could use the present invention in a remote area by means of carrying just a 12 volt battery as an exemplary source of power.

Screws 50 can be provided on baffle 16 as a point of attachment for lead wires 46, 47 when not in use. Wires 46, 47 can be wrapped around handle 30 with the clip portions of wires 46, 47 attaching and clamping to screws 50.

The present invention provides other space saving aspects to fishermen for example. Once the catch of fish for the day has been made, and all of the bait fish 27 have been used, the device can easily and quickly be removed from the ice chest or like container 12 simply by lifting vertically on handle 30. The device has no permanent connection to the container 12 and thus can be readily removed and placed aside so the container 12 can be used for other purposes such as icing down the fish which have been in fact caught.

An optional inner baffle 60 can be added (see phantom lines in FIG. 1). Such a baffle provides greater surface area which spreads out bait animals such as shrimp that attach to and crawl upon the inner walls of container 12. This increased surface area to reduce crowding is especially desirable with shrimp since their antennae become tangled under crowded conditions which shorten their life.

Baffle 16 can be any suitable divider which creates a first and a second section within container 12. Although a baffle 16 which conforms substantially to the cross section of container 12 is taught in the preferred embodiment, it should be understood that equivalent structures can be used within the teaching of the present invention. Thus, baffle 16 could be a cylindrical member abutting the bottom 45 and lid 15 of container 12 when closed. A pump could be housed within such a cylindrical baffle and sparges 35 could radiate therefrom and contact the walls of container 12 to provide the desired bracing arrangement.

Similarly, a U-shaped or half cylindrical baffle could be used which would abut any wall of container 12 and conform thereto to create the first and second sections as is desirable. Thus, structural modifications may be necessary to adapt to varying desired containers 12. To one skilled in the art, such modifications can be made using the teaching of the present invention.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. A live bait life-support apparatus for aerating a fluid in a container, such as for example the standard insulated, open top ice chest comprising:
   a. a generally flat, vertically oriented baffle means non-permanently fittable within and easily removable from the container, said baffle means having a cross-section substantially conforming to the cross-section of the container and being locatable toward one end of the container, said baffle means dividing the container into a first larger, bait holding section and a second smaller, pumping section;
   b. flow openings in said baffle means, said openings being large enough to allow a flow of fluid from said first section to said second section, but being small enough to prevent the inadvertent travel of live bait through said openings;
   c. pump means in said second section for circulating the fluid in the container from said first section to said second section, said pump means being in fluid connection with the fluid in the container;
   d. aeration means carried by said baffle means and cooperatively connected to said pump means for aerating fluid within the container, said aeration means comprising:
      i. an elongated conduit cooperatively connected to said pump means at one end for receiving flowing fluid therefrom; and
      ii. an elongated sparger mounted above the surface of fluid within said first section, said sparger being connected to the other end of said conduit to receive the flow of fluid from said conduit from said pump means, said sparger being equipped with a plurality of reduced orifice openings, fluid flow through said sparger being actuated by said pump means to produce a plurality of jets of fluid; and
   e. bracing means for substantially preventing the sideward movement of the live bait life-support apparatus within the container, said bracing means comprising:
      i. a laterally extended, elongated projection attached at one end to the upper portion of said baffle means, and having its other end abutting the container wall to form a brace;
      ii. a base, located at a position lower than said elongated projection being attached at one end to said baffle means and having its other end abutting the same container wall as said elongated projection to form a brace; and
      iii. said sparger being attached at one end portion to said baffle means on the side opposite said elongated projection and said base and having its other end portion abutting the opposing container wall to form a brace, the bracing effect of said sparger, said base, and said, elongated projection in combination with said baffle means substantially conforming to the cross-section of the container, substantially preventing sideward movement of the live bait life-support system within the container; said baffle means and said bracing means being connected together, and being readily and easily removable from and insertable into the container as a single integral unit.

2. The apparatus of claim 1 wherein said extended projection serves as a handle, and wherein said handle is cylindrically shaped and centrally located in a horizontal plane beteen the sides of said baffle means and hence the sides of the container.

3. The apparatus of claim 1 wherein said sparger is located close to one side of the container, leaving the central area of the container in said first section open and unobstructed.

4. The apparatus of claim 1 wherein the container has a curved surface at its interface between its end wall and its bottom and wherein the bottom of said base rests on the bottom of the container and the abutting end of the base is curved to conform to and engage in face-to-face relationship with the interface of the abutting end wall and bottom of the container.

5. The apparatus of claim 1 wherein said sparger is rotatably mounted allowing directional adjustment of the jets of fluid.

6. The apparatus of claim 1 wherein said pump means is battery operated and has at least two electrical wires extending therefrom and terminating in clamps, and wherein said baffle means includes projection means extending out from said baffle means for attaching said clamps when said pump means is not in use.

7. The apparatus of claim 1 wherein said pump means is mounted on the top of said base with its intake located substantially above the bottom of said baffle means and hence the floor of the container.

* * * * *